US010155515B2

United States Patent
Nishiguchi et al.

(10) Patent No.: US 10,155,515 B2
(45) Date of Patent: Dec. 18, 2018

(54) TRAVEL CONTROL DEVICE

(71) Applicant: HONDA MOTOR CO., LTD., Tokyo (JP)

(72) Inventors: Haruhiko Nishiguchi, Wako (JP); Satoshi Fujii, Wako (JP); Daisuke Kubota, Wako (JP); Ryohsaku Arakawa, Wako (JP); Kei Oshida, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 15/435,650

(22) Filed: Feb. 17, 2017

(65) Prior Publication Data
US 2017/0240172 A1 Aug. 24, 2017

(30) Foreign Application Priority Data
Feb. 18, 2016 (JP) ................. 2016-028684

(51) Int. Cl.
A01B 69/00 (2006.01)
B62D 6/00 (2006.01)
B62D 11/00 (2006.01)
B62D 12/00 (2006.01)
B63G 8/20 (2006.01)
B63H 25/04 (2006.01)
(Continued)

(52) U.S. Cl.
CPC ...... *B60W 30/12* (2013.01); *B60W 30/18163* (2013.01); *B60W 50/14* (2013.01); *G08G 1/166* (2013.01); *G08G 1/167* (2013.01); *B60W 2050/0068* (2013.01); *B60W 2420/42* (2013.01); *B60W 2420/52* (2013.01); *B60W 2540/20* (2013.01); *B60W 2550/10* (2013.01); *G06K 9/00805* (2013.01)

(58) Field of Classification Search
CPC ........... B60W 30/12; B60W 30/18163; B60W 50/14; G08G 1/166; G08G 1/167; G08G 1/16
USPC ................................. 701/41; 70/41
See application file for complete search history.

(56) References Cited

U.S. PATENT DOCUMENTS

2012/0296522 A1* 11/2012 Otuka ................. G08G 1/167
701/41
2017/0305421 A1* 10/2017 Sekizawa ............. B60W 30/12

FOREIGN PATENT DOCUMENTS

JP  2012-226392 A  11/2012
JP  2015-101282 A  6/2015
JP  2015-223933 A  12/2015

OTHER PUBLICATIONS

Office Action dated Oct. 24, 2017, issued in counterpart Japanese Application No. 2016-028684, with English machine translation. (6 pages).

(Continued)

*Primary Examiner* — Mahmoud S Ismail
(74) *Attorney, Agent, or Firm* — Westerman, Hattori, Daniels & Adrian, LLP

(57) ABSTRACT

A lane change controller determines whether lane change is available or unavailable on the basis of a detection result of an obstacle by a radar and an obstacle recognizer in response to detection of a winker operation by an operation detection unit. A lane keep controller continues lane keep control if the operation detection unit detects the winker operation during the lane keep control and if the lane change controller determines that the lane change is unavailable.

13 Claims, 11 Drawing Sheets

(51) Int. Cl.
 *G05D 1/00* (2006.01)
 *G06F 7/00* (2006.01)
 *G06F 17/00* (2006.01)
 *G06F 19/00* (2018.01)
 *B60W 30/12* (2006.01)
 *G08G 1/16* (2006.01)
 *B60W 50/14* (2012.01)
 *B60W 30/18* (2012.01)
 *B60W 50/00* (2006.01)
 *G06K 9/00* (2006.01)

(56) References Cited

OTHER PUBLICATIONS

Office Action dated Mar. 27, 2018, issued in counterpart Japanese Application No. 2016-028684, with English transaltion (7 pages).

* cited by examiner

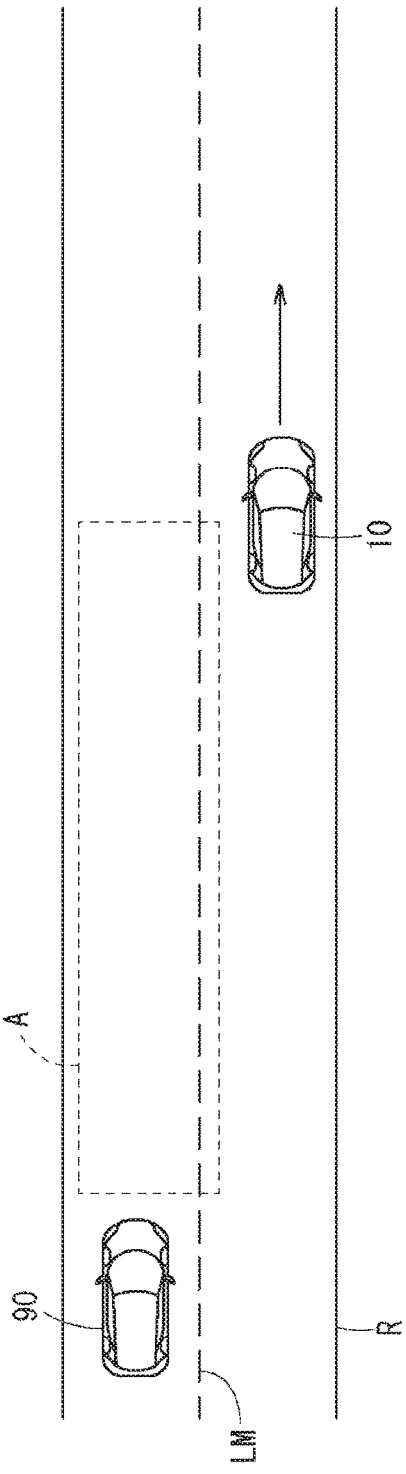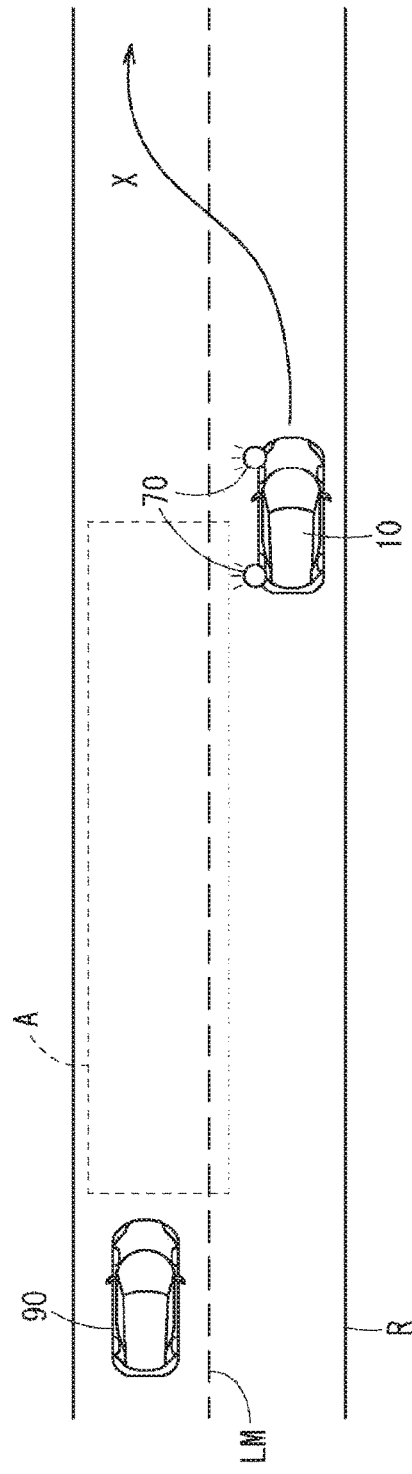

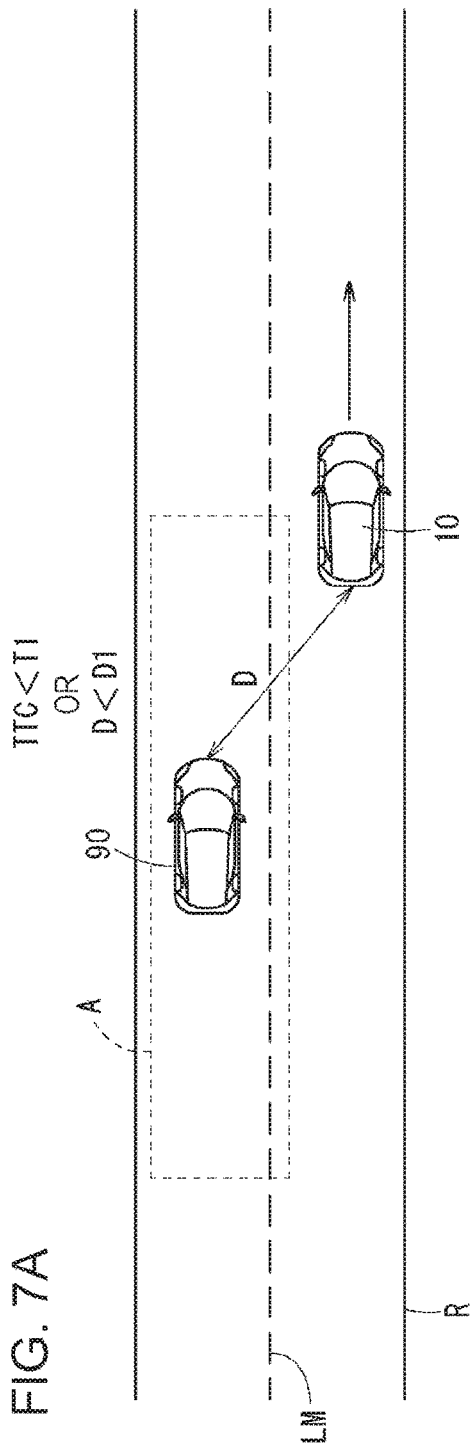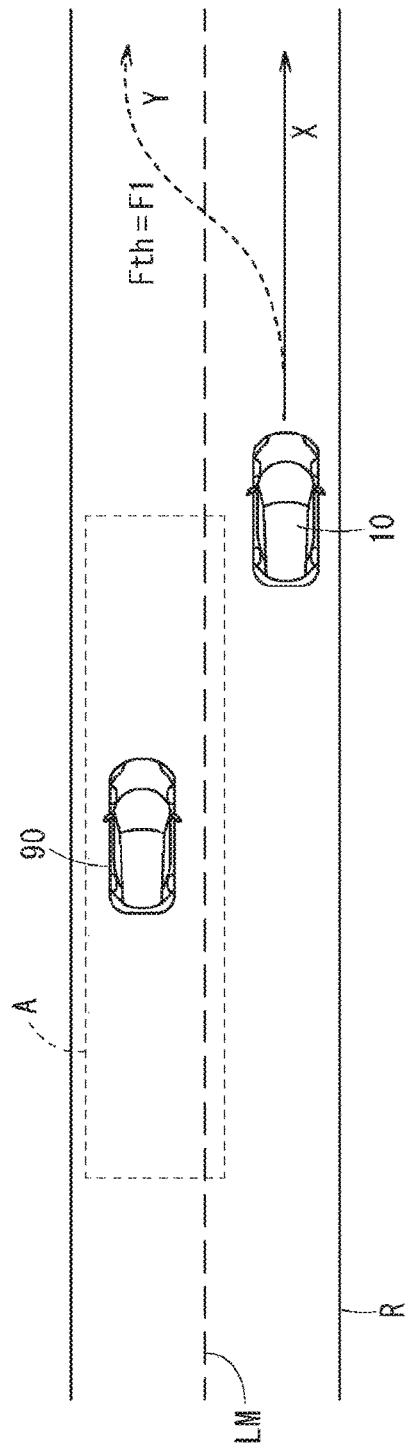

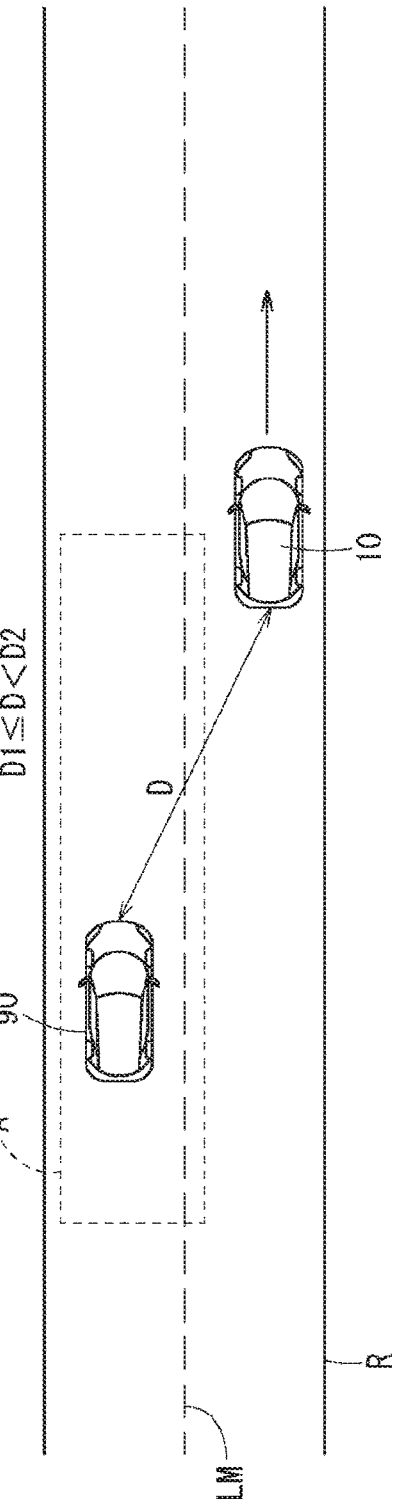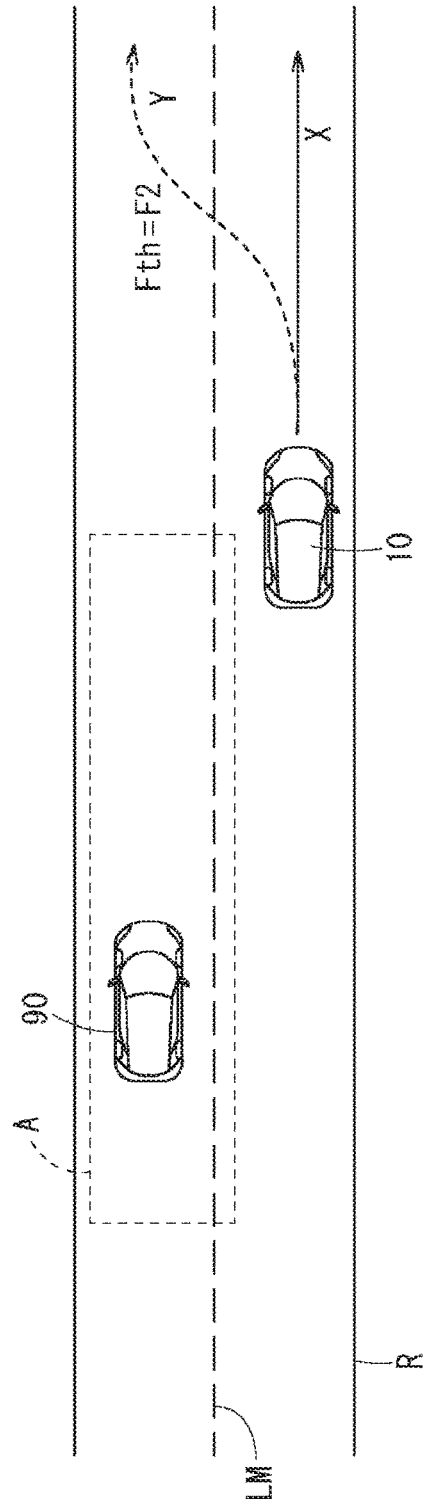

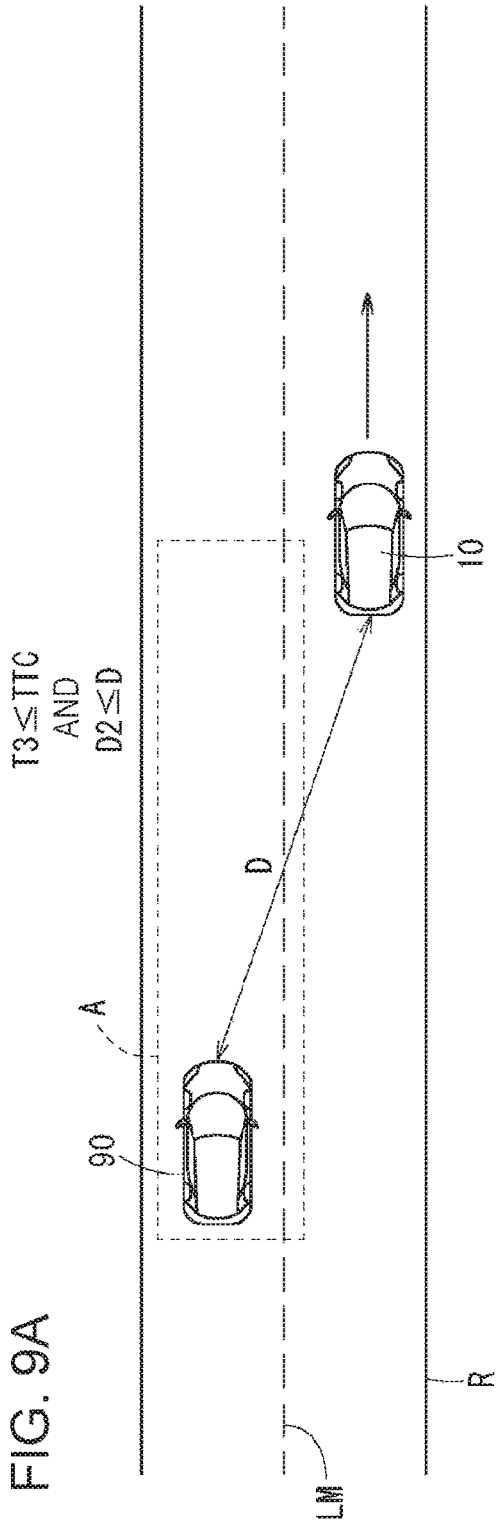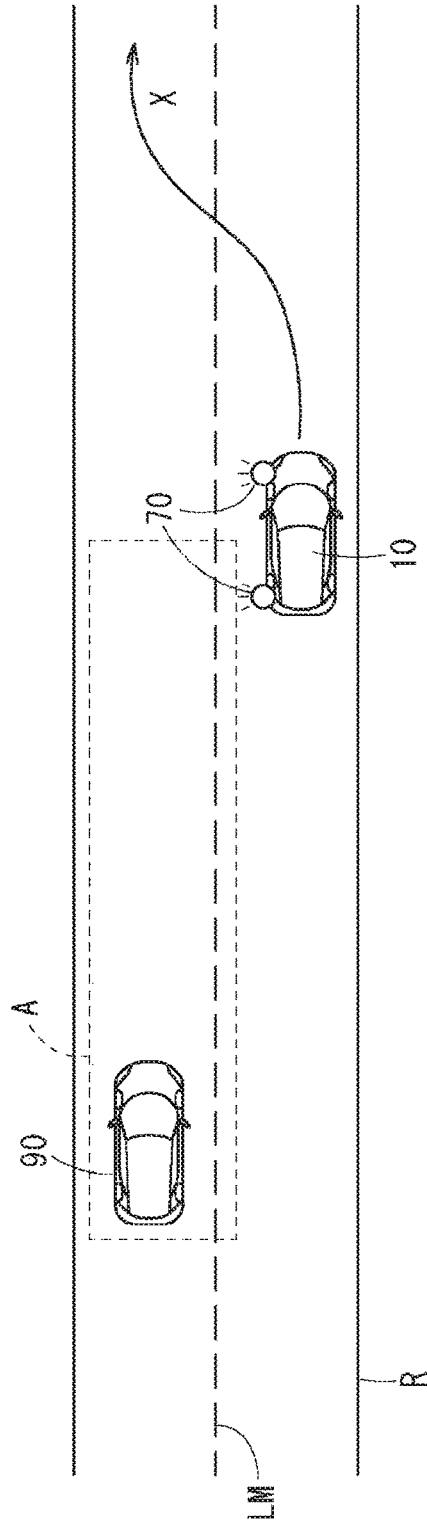

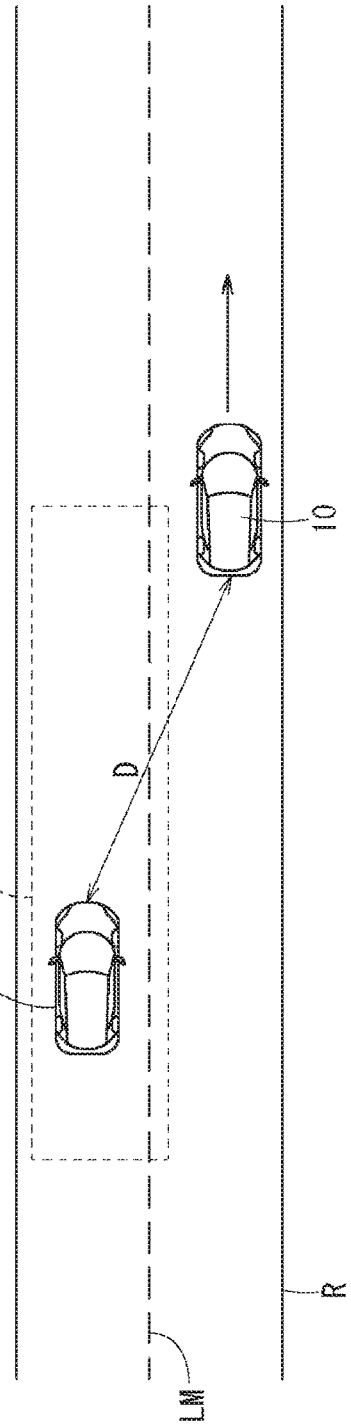
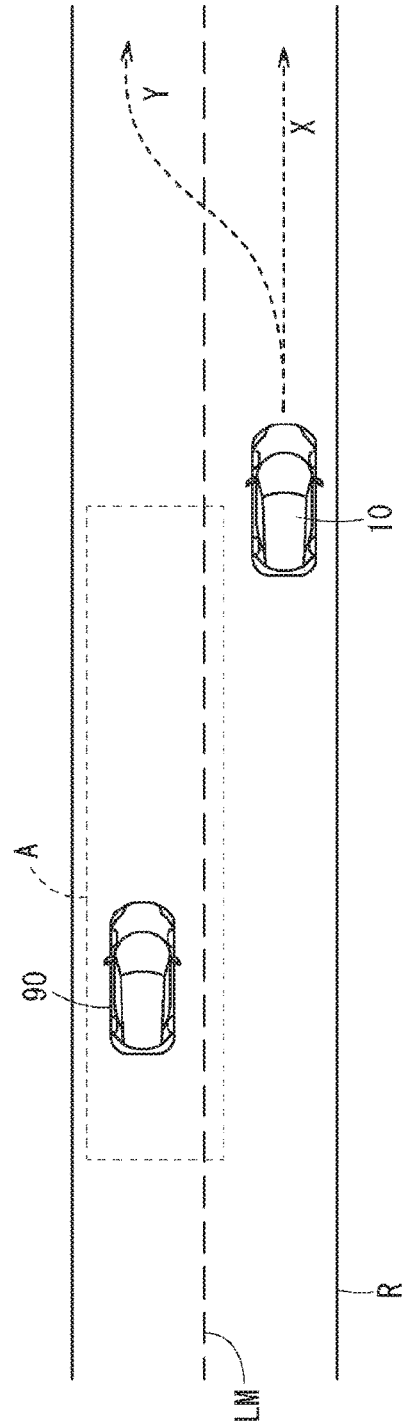

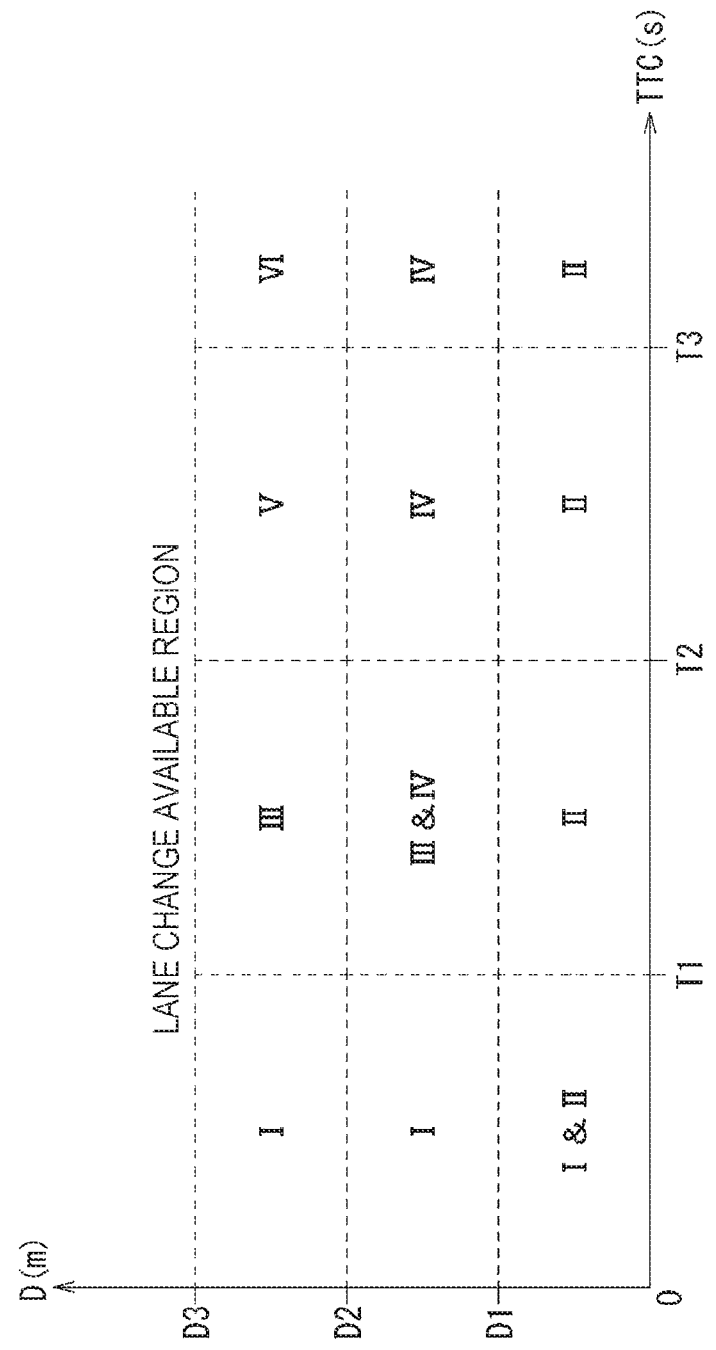

TRAVEL CONTROL DEVICE

CROSS REFERENCES TO RELATED APPLICATIONS

The present application claims priority under 35 U.S.C. § 119 to Japanese Patent Application No. 2016-028684, filed Feb. 18, 2016, entitled "Travel Control Device." The contents of this application are incorporated herein by reference in their entirety.

TECHNICAL FIELD

The present disclosure relates to a travel control device that executes lane keep control and lane change control being travel assistance (automatic control) for a vehicle.

BACKGROUND

Japanese Unexamined Patent Application Publication No. 2012-226392 (paragraphs [0021] to [0023]) provides a drive assistance system that executes two types of travel assistance, in particular, lane keep assistance (also referred to as lane keep control) and lane change assistance (also referred to as lane change control). The drive assistance system provides the lane change assistance in response to an operation (a winker operation) with a direction indicator. If the direction indicator is operated during the lane keep assistance, it is checked whether or not the other vehicle is present at the front and rear lateral side, if the other vehicle is not present, the lane to be kept is changed from the current lane to a lane in a change direction, and the lane keep assistance is continued.

Japanese Unexamined Patent Application Publication No. 2012-226392 describes restriction of the lane change control if the other vehicle is present at the rear lateral side when the direction indicator is operated during the lane keep control; however, does not describe the lane keep control after the situation. In general, a vehicle of related art that executes only the vehicle keep control as travel assistance is configured to cancel the lane keep control in response to an operation with a steering wheel or the direction indicator. As compared with the vehicle of related art, the configuration described in Japanese Unexamined Patent Application Publication No. 2012-226392 invalidates the lane change control and cancels the lane keep control if the other vehicle is present at the rear lateral side when the direction indicator is operated. That is, even when a driver intends to continue the lane keep control after changing the lane, the lane keep control may be canceled contrarily to the intention of the driver.

SUMMARY

The present application provides, for example, a travel control device that can provide travel assistance meeting an intention of a driver.

According to a first aspect of the embodiment, a travel control device includes a surrounding detection unit that detects a surrounding situation of a vehicle; an intention detection unit that detects a lane change intention of a driver; a lane keep controller that executes lane keep control on the basis of a detection result of a lane mark by the surrounding detection unit; and a lane change controller that determines whether lane change is available or unavailable on the basis of a detection result of an obstacle by the surrounding detection unit in response to the detection of the lane change intention by the intention detection unit, and executes lane change control if the lane change controller determines that the lane change is available. The lane keep controller continues the lane keep control if the intention detection unit detects the lane change intention during the lane keep control and if the lane change controller determines that the lane change is unavailable.

With the aspect, even if the lane change control is not executed, the lane keep control is not canceled and is continued. Hence, if the driver provides the lane change intension to intend to execute the lane change control while continuing the lane keep control, a vehicle operation not intended by the driver, in which the lane change control is invalidated and the lane keep control is canceled, can be improved. Accordingly, travel assistance meeting the intention of the driver can be continued.

According to a second aspect of the embodiment, the lane keep controller may continue the lane keep control if the lane change controller changes the determination to the determination that the lane change is unavailable in a period from the determination that the lane change is available by the lane change controller to the detection of the lane change intention by the intention detection unit.

The driver provides the lane change intension after the determination that the lane change is available in the vehicle. However, the situation may change to the situation in which the lane change is unavailable during the period of time from the determination that the lane change is available in the vehicle to the time when the lane change intention is provided by the driver. It is expected that the lane change intention of the driver detected in such a situation is not the intention of canceling the assistance such as the lane keep control, but is the intention of shifting the control from the lane keep control to the lane change control while continuing the assistance. With the aspect, since the lane change control is not executed, the cancellation of the lane keep control, not intended by the driver, can be prevented from occurring.

According to a third aspect of the embodiment, the lane change intention may be a winker operation performed by the driver. With the aspect, the driver can provide the lane change intention by the simple operation.

According to a fourth aspect of the embodiment, the lane keep control may be canceled in response to a cancel operation performed by the driver, and if the lane keep controller continues the lane keep control, the lane keep controller may allow the cancel operation to be more easily performed as compared with a cancel operation in a normal situation.

Further, according to a fifth aspect of the embodiment, the lane keep control may be canceled if the cancel operation is executed by a predetermined operation amount or larger or continuously for a predetermined operation time or longer. If the lane keep controller continues the lane keep control, the lane keep controller may set the predetermined operation amount to be smaller than a normal value or sets the predetermined operation time to be shorter than a normal value. With the aspects, although the lane keep control is continued, the lane keep control can be more easily canceled in response to the lane change intension of the driver, and hence travel assistance meeting the intension of the driver can be provided.

According to a sixth aspect of the embodiment, the lane keep controller may change the predetermined operation amount or the predetermined operation time in accordance with a distance or a time to collision of the vehicle with respect to the obstacle. With the aspect, the predetermined operation amount or the predetermined operation time for canceling the lane keep control is changed in accordance with the positional relationship with respect to the obstacle (the other vehicle) in the surrounding of the vehicle, and hence travel assistance further meeting the intention of the driver can be provided.

According to a seventh aspect of the embodiment, the lane keep controller may set the cancel operation to be the same as the cancel operation in the normal situation if a certain time elapses since the cancel operation was set to be more easily performed as compared with the cancel operation in the normal situation. With the aspect, the lane keep control in the normal situation is executed while it is expected that the driver no longer has the lane change intention if the certain time elapses, and hence stable travel assistance can be continued.

According to an eighth aspect of the embodiment, the lane keep controller may cancel the lane keep control if the intention detection unit detects the lane change intention after a predetermined time or longer elapses since the lane change controller changed the determination to the determination that the lane change is unavailable.

For example, in the case where the lane change intension is indicated by the winker operation, if the driver fails the winker operation, the driver is required to perform the winker operation again. At this time, the lane change intension of the driver is not detected immediately after the determination that the lane change is available in the vehicle, and the lane change intension is detected after a certain time elapses. It may be expected that the determination is changed to the determination that the lane change is unavailable in the vehicle in this period. With the aspect, if the predetermined time does not elapse since the change to the determination that the lane change is unavailable, it is expected that the driver provides the lane change intention again by the mistake, and the lane keep control can be continued. Also, if the predetermined time or longer elapses since the change to the determination that the lane change is unavailable, it is expected that the driver intends to cancel the lane keep control, and the lane keep control can be canceled.

BRIEF DESCRIPTION OF THE DRAWINGS

The advantages of the disclosure will become apparent in the following description taken in conjunction with the following drawings.

FIG. 6A is a state explanatory view of own vehicle and the other vehicle before assistance judgment. FIG. 6B is a state explanatory view of the own vehicle after the assistance judgment.

FIG. 7A is a state explanatory view of the own vehicle and the other vehicle before assistance judgment.

FIG. 7B is a state explanatory view of the own vehicle after the assistance judgment.

FIG. 8A is a state explanatory view of the own vehicle and the other vehicle before assistance judgment. FIG. 8B is a state explanatory view of the own vehicle after the assistance judgment.

FIG. 9A is a state explanatory view of the own vehicle and the other vehicle before assistance judgment. FIG. 9B is a state explanatory view of the own vehicle after the assistance judgment.

FIG. 10A is a state explanatory view of the own vehicle and the other vehicle before assistance judgment. FIG. 10B is a state explanatory view of the own vehicle after the assistance judgment.

FIG. 11 is a map for conditions including the time to collision TTC and the distance D.

DETAILED DESCRIPTION

A travel control device 12 according to this application is described in detail below along with a desirable embodiment with reference to the accompanying drawings.

1. Configuration of Travel Control Device 12

Figure 1:
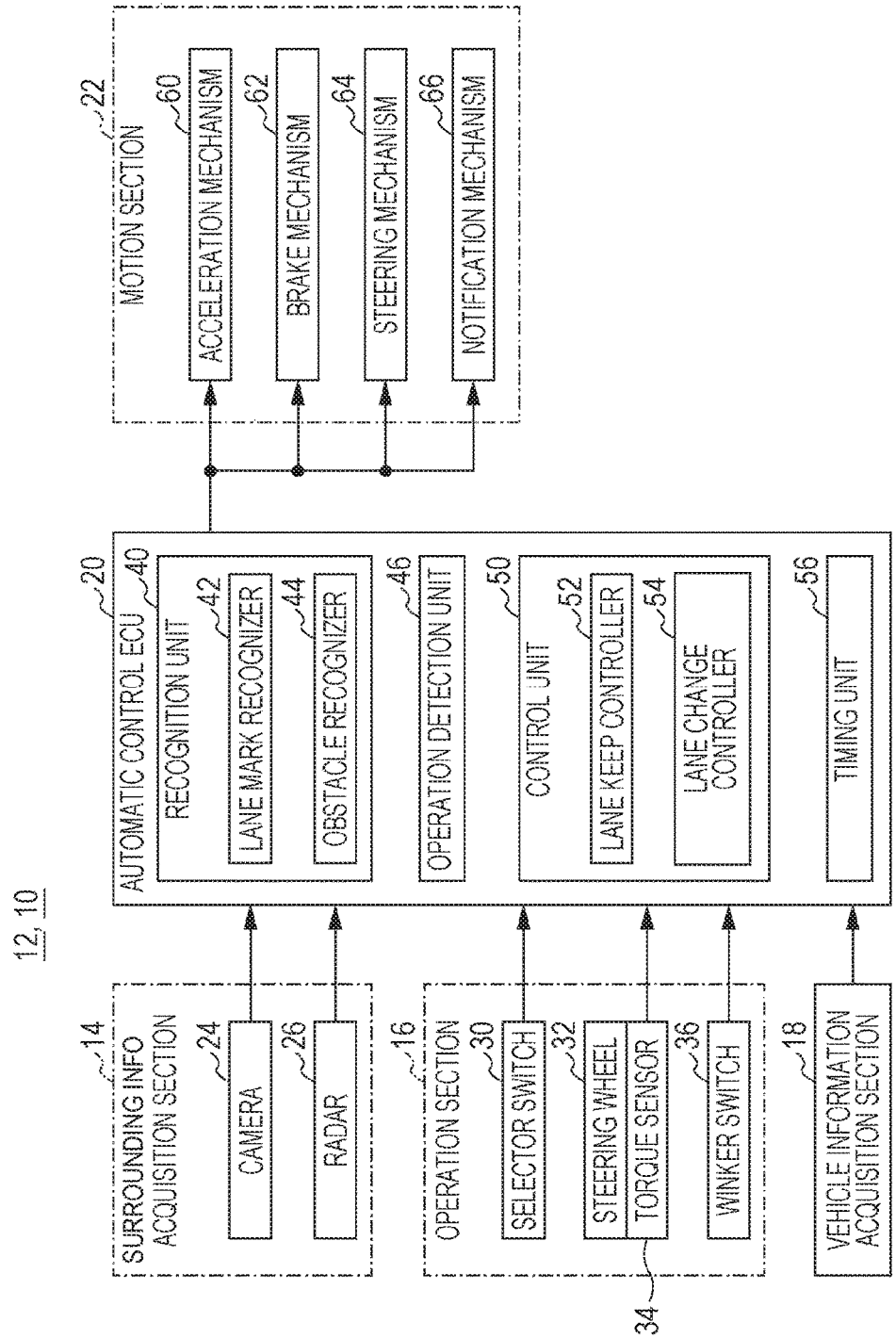
FIG. 1 is a block diagram of a travel control device according to an embodiment.

A configuration of the travel control device 12 is described with reference to FIG. 1. The travel control device 12 is provided in a vehicle 10 (also referred to as own vehicle 10). The travel control device 12 includes a surrounding information acquisition section 14 that acquires information required for automatic control (including semi-automatic control), an operation section 16, a vehicle information acquisition section 18, an automatic control ECU 20 that executes automatic control, and a motion section 22 that operates according to automatic control.

The surrounding information acquisition section 14 includes a camera 24 and a plurality of radars 26. The camera 24 is provided to face the front of the vehicle 10 so that the camera 24 can capture an image at the front of the vehicle 10, including a travel road R (see FIG. 6A). As the camera 24, for example, a monocular camera, a stereo camera, or an infrared camera may be used. The camera 24 outputs captured image information to the automatic control ECU 20. The plurality of radars 26 are provided to face the front, left, right, rear, and other directions of the vehicle 10 so that the radars 26 can detect an obstacle (the other vehicle) 90 (see FIG. 6A) in the surrounding of the vehicle 10. As the radars 26, for example, millimeter-wave radars, micrometer-wave radars, or laser radars may be used. The radars 26 output obstacle information (position information, distance information) to the automatic control ECU 20. For the distance information, a distance D between a predetermined portion of the vehicle 10 and a predetermined portion of the obstacle (the other vehicle) 90 is measured. If the obstacle 90 is the other vehicle 90 as described later, a distance D between the rear bumper of the vehicle 10 and the front bumper of the other vehicle 90 is measured. Also, a fusion sensor that integrates the captured image information acquired by the camera 24 and the obstacle information acquired by the radars 26 may be used.

The operation section 16 includes a selector switch 30, a steering wheel 32, and a winker switch 36 that are operated by a driver. The selector switch 30 is provided at an instrumental panel or the steering wheel 32, and outputs an instruction signal or a cancel signal for lane keep control to the automatic control ECU 20 in response to an operation by the driver. In the following description, the instruction signal for the lane keep control is referred to as lane keep signal, and the cancel signal for the lane keep control is merely referred to as cancel signal. A steering mechanism 64 is provided with a torque sensor 34. The torque sensor 34 measures a steering torque in accordance with steering of the steering wheel 32, and outputs a torque signal indicative of the steering torque to the automatic control ECU 20. The winker switch 36 outputs a leftward or rightward instruction signal for lane change control to the automatic control ECU 20 in response to a winker operation by the driver. In the following description, the instruction signal for the lane change control is referred to as lane change signal.

The vehicle information acquisition section 18 includes various sensors and various devices that acquire vehicle motion information required for the lane keep control and the lane change control. For example, a vehicle speed sensor, an acceleration sensor, a yaw rate sensor, a steering angle sensor, a positioning device, and a car navigation device (either not shown) are provided. The sensors and devices output acquired vehicle information to the automatic control ECU 20.

The automatic control ECU 20 is a calculator including a microcomputer, and includes a CPU, a ROM (including an EEPROM), a RAM, input/output devices, such as an A/D converter and a D/A converter, and other devices. The automatic control ECU 20 functions as various function realization units when the CPU reads out programs stored in the ROM and executes the programs. In this embodiment, the automatic control ECU 20 functions as a recognition unit 40, an operation detection unit 46, a control unit 50, and a timing unit 56 by executing the programs. The automatic control ECU 20 may be divided into plural portions, or may be integrated with another ECU. Alternatively, all the functions or part of the functions may be realized by hardware.

The recognition unit 40 includes a lane mark recognizer 42 and an obstacle recognizer 44. The lane mark recognizer 42 is configured to recognize a lane mark LM (see FIG. 6A) on the travel road R on the basis of the captured image information acquired by the camera 24. The lane mark LM can be recognized by existing image analysis. The obstacle recognizer 44 is configured to recognize the obstacle (the other vehicle) 90 (see FIG. 6A) present in the surrounding of the vehicle 10 on the basis of the obstacle information acquired by the radars 26, and calculate the position and distance D of the obstacle 90. Also, the obstacle recognizer 44 is configured to calculate a time to collision TTC on the basis of the relative speed and distance D of the vehicle 10 with respect to the obstacle (the other vehicle) 90. Further, the obstacle recognizer 44 is configured to determine whether or not the obstacle (the other vehicle) 90 is present in a predetermined area A (see FIG. 6A) at the rear left and rear right of the vehicle 10. The predetermined area A may be previously set as a constant area, or may be appropriately set in accordance with the vehicle speed of the vehicle 10. The surrounding information acquisition section 14 and the recognition unit 40 correspond to a surrounding detection unit that detects a surrounding situation of the vehicle 10.

The operation detection unit 46 is configured to detect an intention of the driver, that is, various operations performed by the driver. In this case, the operation detection unit 46 is configured to detect the lane keep signal, the cancel signal, the torque signal, and the lane change signal output from the operation section 16. The operation detection unit 46 corresponds to an intention detection unit that detects a lane change intention of the driver.

The control unit 50 includes a lane keep controller 52 and a lane change controller 54. The lane keep controller 52 is configured to execute lane keep control to keep the distance between the vehicle 10 and the lane mark LM at a target distance on the basis of the vehicle information acquired by the vehicle information acquisition section 18 and the lane mark LM recognized by the lane mark recognizer 42. The lane keep controller 52 is configured to start the lane keep control if the operation detection unit 46 detects the lane keep signal, and cancel the lane keep control if the operation detection unit 46 detects the cancel signal. Also, as described later, the lane keep controller 52 is configured to cancel the lane keep control also in a certain situation unavailable for the lane change controller (step S32 in FIG. 4). Further, the lane keep controller 52 is configured to allow override (a temporary manual operation) if the steering torque indicated by the torque signal detected by the operation detection unit 46 is a predetermined operation amount or larger. The predetermined operation amount is referred to as override threshold Fth. It is assumed that a normal value of the override threshold Fth is F1. Alternatively, a steering time or a steering speed may be set as the override threshold instead of the steering torque. In this case, a predetermined operation time is set. The lane change controller 54 is configured to determine whether the lane change is available or unavailable on the basis of the detection result (the position, distance D, and time to collision TTC) of the obstacle (the other vehicle) 90 by the obstacle recognizer 44. Further, the lane change controller 54 is configured to execute the lane change control on the basis of the vehicle information acquired by the vehicle information acquisition section 18 if the operation detection unit 46 detects the lane change signal and determines that the lane change is available.

The timing unit 56 is configured to measure various times.

The motion section 22 includes an acceleration mechanism 60, a brake mechanism 62, the steering mechanism 64, and a notification mechanism 66 that operate in accordance with control signals output from the automatic control ECU 20. The acceleration mechanism 60 includes a drive source, such as an engine or a motor, and a drive source ECU (either not shown). The drive source ECU causes the drive source to operate in accordance with an acceleration instruction output from the automatic control ECU 20. The brake mechanism 62 includes a brake and a brake ECU (either not shown). The brake ECU causes the brake to operate in accordance with a deceleration instruction output from the automatic control ECU 20. The steering mechanism 64 includes an electric power steering and a steering ECU (either not shown). The steering ECU causes a motor of the electric power steering to operate in accordance with a steering instruction output from the automatic control ECU 20. The notification mechanism 66 includes a notification device, such as a display and/or a loudspeaker, and a notification ECU (either not shown). The notification mechanism 66 causes the notification device to operate in accordance with a notification instruction output from the automatic control ECU 20.

2. Operation of Travel Control Device 12

This embodiment automatically executes the lane change control in accordance with the lane change intention of the driver during the lane keep control. The lane keep control is executed as follows. The driver operates the selector switch 30 when executing the lane keep control. The selector switch 30 outputs the lane keep signal to the automatic control ECU 20 in response to the operation by the driver. When the operation detection unit 46 detects the lane keep signal, the lane keep control by the lane keep controller 52 is started. The lane keep controller 52 executes the lane keep control on the basis of the vehicle information acquired by the vehicle information acquisition section 18 and the detection result of the lane mark LM by the camera 24.

Figure 2:
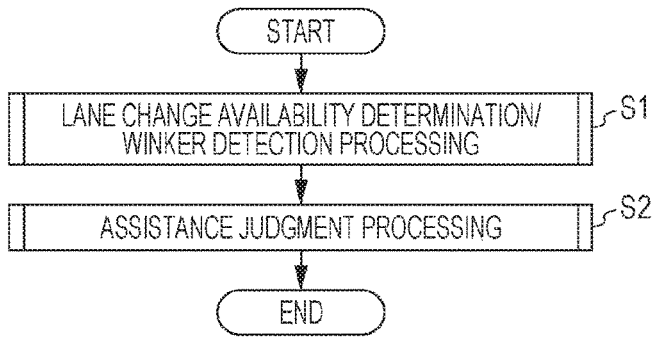
FIG. 2 is a flowchart of processing executed by the travel control device.

Then, a series of operations of the travel control device 12 executed during the lane keep control is described with reference to FIGS. 2 to 5. As shown in FIG. 2, the travel control device 12 executes lane change availability determination/winker detection processing in step S1, and then executes assistance judgment processing in step S2. In the following description, respective processing executed in step S1 and step S2 are individually described. The respective processing are executed by the control unit 50. Synchronously with the respective processing, the surrounding information acquisition section 14 and the vehicle information acquisition section 18 periodically acquire respective pieces of information.

2.1 Lane Change Availability Determination/Winker Detection Processing

A procedure of the lane change availability determination/winker detection processing (step S1 in FIG. 2) is described with reference to FIG. 3. In the lane change availability determination/winker detection processing described below, it is determined whether the lane change by automatic control is available or unavailable, and the lane change intention of the driver is detected, or in other words, the winker operation is detected.

In step S11, the availability of the lane change is determined. The lane change controller 54 determines the presence of the obstacle (the other vehicle) 90 on the basis of the obstacle detection result of the radars 26, and determines whether the lane change is available or unavailable. To be specific, it is determined whether or not the obstacle (the other vehicle) 90 is present in the predetermined area A at the rear left and rear right of the vehicle 10. As shown in FIG. 6A, if the obstacle is not present in the predetermined area A (step S11: NO), the processing goes to step S12. In contrast, as shown in FIGS. 7A, 8A, 9A, and 10A, if the obstacle (the other vehicle) 90 is present in the predetermined area A (step S11: YES), the processing goes to step S13. Then, in step S13, the driver is notified about that the lane change is unavailable, and the processing returns to S11.

In step S12, the driver is notified about that the lane change is available. At this time, the automatic control ECU 20 outputs a notification instruction indicative of that the lane change is available to the notification mechanism 66. Then, notification indicative of that the lane change is available is made by the display and/or the loudspeaker of the notification mechanism 66.

In step S14, the timing unit 56 sets 0 (zero) for a timer T. The timer T is used if the state is changed from the lane change available state to the lane change unavailable state.

In step S15, it is determined whether or not the lane change intention of the driver is detected, that is, the presence of the winker operation. The driver lights on a winker in a lane change direction by operating the winker switch 36 when indicating the lane change intention. When the winker switch 36 is operated, the lane change signal is output. The operation detection unit 46 detects the lane change signal. If the winker operation is present, that is, if the operation detection unit 46 detects the lane change signal (step S15: YES), the processing goes to step S16. In contrast, if the winker operation is not present, that is, if the operation detection unit 46 does not detect the lane change signal (step S15: NO), the processing goes to step S17.

In step S16, if the time is measured with the timer T, the timing unit 56 stops the time measurement. In contrast, if the time is not measured in this phase, the time measurement is not required to be stopped. When step S16 is ended, the lane change availability determination/winker detection processing is ended.

The processing in step S17 and later is repeated until the driver operates the winker switch 36. In step S17, it is determined whether the lane change is available or unavailable similarly to step S11. As shown in FIG. 6A, if the obstacle (the other vehicle) 90 is not present in the predetermined area A (step S17: NO), the processing goes to step S12. In contrast, as shown in FIGS. 7A, 8A, 9A, and 10A, if the obstacle (the other vehicle) 90 is present in the predetermined area A (step S17: YES), the processing goes to step S18. Then, in step S18, the driver is notified about that the lane change is unavailable, and the processing goes to S19.

In step S19, the timing unit 56 measures the time with the timer T. If the time is not measured in this phase, the time measurement is started. If the time has been measured already in this phase, the time measurement is continued. Then, the processing returns to step S15.

2.2 Assistance Judgment Processing

A procedure of assistance judgment processing (step S2 in FIG. 2) is described with reference to FIGS. 4 and 5. In the assistance judgment processing described below, the assistance contents to be executed are determined in accordance with the time to collision TTC and the distance D of the vehicle 10 with respect to the obstacle (the other vehicle) 90.

Figure 3:
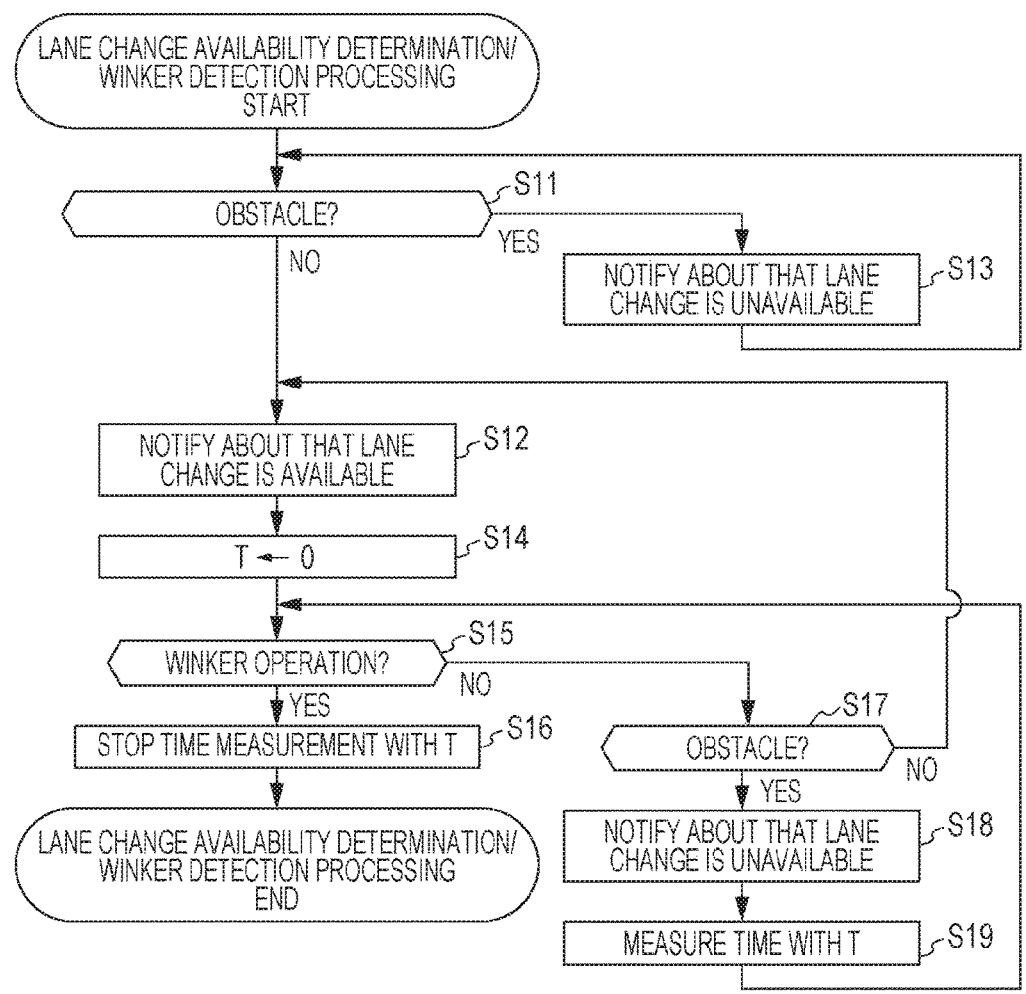
FIG. 3 is a flowchart of lane change availability determination/winker detection processing.

In step S21, it is determined whether the lane change is available or unavailable similarly to step S11 in FIG. 3. As shown in FIG. 6A, if the obstacle (the other vehicle) 90 is not present in the predetermined area A (step S21: NO), the processing goes to step S22. In contrast, as shown in FIGS. 7A, 8A, 9A, and 10A, if the obstacle (the other vehicle) 90 is present in the predetermined area A (step S21: YES), the processing goes to step S23.

In step S22, the lane change controller 54 executes the lane change control on the basis of respective pieces of information acquired by the surrounding information acquisition section 14 and the vehicle information acquisition section 18. As indicated by solid-line arrow X in FIG. 6B, the vehicle 10 changes the lane by automatic control while blinking a winker 70 in a winker operation direction (step S15 in FIG. 3).

In step S23, the time measured with the timer T is compared with a predetermined time Tth. The predetermined time Tth is set to distinguish the intention of the driver who makes the winker operation. The timer T measures the elapsed time since the lane change controller 54 changed the determination from the determination that the lane change is available to the determination that the lane change is unavailable (step S19 in FIG. 3). In this embodiment, if the time measured with the timer T is the previously set predetermined time Tth or longer (step S23: YES), it is expected that the driver may intend to change the lane by manual control. At this time, the processing goes to step S24. In contrast, in this embodiment, if the time measured with the timer T is shorter than the previously set predetermined time Tth (step S23: NO), it is expected that the driver may intend to change the lane by automatic control. At this time, the processing goes to step S33 shown in FIG. 5.

In step S24, the time to collision TTC of the vehicle 10 with respect to the obstacle (the other vehicle) 90 is compared with a first time T1, and the distance D between the vehicle 10 and the obstacle (the other vehicle) 90 is compared with a first distance D1. If the time to collision TTC is equal to or longer than the first time T1, and if the distance D is equal to or larger than the first distance D1 (step S24: YES), the processing goes to step S27. In contrast, as shown in FIG. 7A, if the time to collision TTC is shorter than the first time T1, or if the distance D is smaller than the first distance D1 (step S24: NO), the processing goes to step S25.

In step S25, the lane keep controller 52 sets a normal value F1 for the override threshold Fth. That is, the override threshold Fth is held without change. If the steering time is set for the override threshold, a normal value (a normal time) is set.

In step S26, the lane keep controller 52 continues the lane keep control on the basis of respective pieces of information acquired by the surrounding information acquisition section 14 and the vehicle information acquisition section 18. As indicated by solid-line arrow X in FIG. 7B, the vehicle 10 keeps the travel lane by automatic control. However, if the steering torque being the override threshold Fth (=F1) or larger is detected, the lane can be changed by manual operation as indicated by broken-line arrow Y.

In step S27, the time to collision TTC of the vehicle 10 with respect to the obstacle (the other vehicle) 90 is compared with a second time T2 (>T1), and the distance D between the vehicle 10 and the obstacle (the other vehicle) 90 is compared with a second distance D2 (>D1). If the time to collision TTC is equal to or longer than the second time T2, and if the distance D is equal to or larger than the second distance D2 (step S27: YES), the processing goes to step S30. In contrast, as shown in FIG. 8A, if the time to collision TTC is shorter than the second time T2 (and is equal to or longer than the first predetermined time T1), or if the distance D is smaller than the second distance D2 (and is equal to or larger than the first distance D1) (step S27: NO), the processing goes to step S28.

In step S28, the lane keep controller 52 sets a value F2 smaller than the normal value F1 for the override threshold Fth. That is, the override threshold Fth is set to be smaller than that in the normal situation. If the steering time is set for the override threshold, the steering time is set to be shorter than the normal value (the normal time). As the result, the lane keep control can be canceled by the driver with the smaller steering torque or the shorter steering time. In this way, the lane keep controller 52 allows the cancel operation of the lane keep control to be more easily performed as compared with the cancel operation in the normal situation.

In step S29, the lane keep controller 52 continues the lane keep control on the basis of respective pieces of information acquired by the surrounding information acquisition section 14 and the vehicle information acquisition section 18. As indicated by solid-line arrow X in FIG. 8B, the vehicle 10 keeps the travel lane by automatic control. However, if the steering torque being the override threshold Fth (=F2) or larger is detected, the lane can be changed by manual operation as indicated by broken-line arrow Y.

In step S30, the time to collision TTC of the vehicle 10 with respect to the obstacle (the other vehicle) 90 is compared with a third time T3 (>T2). As shown in FIG. 9A, if the time to collision TTC is the third time T3 or longer (step S30: YES), the processing goes to step S31. In contrast, as shown in FIG. 10A, if the time to collision TTC is shorter than the third time T3 (and is equal to or longer than the second time T2) (step S30: NO), the processing goes to step S32. Since the distance D is the relatively large second distance D2 or larger in step S30, the judgment for the distance D is not required.

In step S31, the lane change controller 54 executes the lane change control on the basis of respective pieces of information acquired by the surrounding information acquisition section 14 and the vehicle information acquisition section 18. As indicated by solid-line arrow X in FIG. 9B, the vehicle 10 changes the lane by automatic control while blinking a winker 70 in a winker operation direction (step S15 in FIG. 3). In this case, as shown in FIGS. 9A and 9B, the obstacle (the other vehicle) 90 is present in the predetermined area A. However, the distance D is the relatively large second distance D2 or larger, and the time to collision TTC is sufficient (the third time T3 or longer). Hence, the lane change by automatic control is available.

In step S32, the lane keep controller 52 cancels the lane keep control. As indicated by broken-line arrow X in FIG. 10B, the lane can be kept by manual operation. Also, as indicated by broken-line arrow Y in FIG. 10B, the lane can be changed by manual operation.

Referring back to FIG. 5, the processing in step S33 and later is described. If the time measured with the timer T is shorter than the previously set predetermined time Tth in step S23 in FIG. 4 (step S23: NO), the processing goes to step S33. In step S33, determination similar to step S24 is made. That is, the time to collision TTC of the vehicle 10 with respect to the obstacle (the other vehicle) 90 is compared with the first time T1, and the distance D between the vehicle 10 and the obstacle (the other vehicle) 90 is compared with the first distance D1. If the time to collision TTC is equal to or longer than the first time T1, and if the distance D is equal to or larger than the first distance D1 (step S33: YES), the processing goes to step S34. In contrast, if the time to collision TTC is shorter than the first time T1, or if the distance D is smaller than the first distance D1 (step S33: NO), the processing goes to step S36.

In step S34, the lane keep controller 52 sets the value F2 smaller than the normal value F1 for the override threshold Fth similarly to step S28. That is, the override threshold Fth is set to be smaller than that in the normal situation. If the steering time is set for the override threshold, the steering time is set to be shorter than the normal value (the normal time). As the result, the lane keep control can be canceled by the driver with the smaller steering torque or the shorter steering time. In this way, the lane keep controller 52 allows the cancel operation of the lane keep control to be more easily performed as compared with the cancel operation in the normal situation.

In step S35, the lane keep controller 52 continues the lane keep control on the basis of respective pieces of information acquired by the surrounding information acquisition section 14 and the vehicle information acquisition section 18 similarly to step S29. At this time, the vehicle 10 keeps the travel lane by automatic control. However, if the steering torque being the override threshold Fth (=F2) or larger is detected, the lane can be changed by manual operation.

In step S36, the lane keep controller 52 sets the normal value F1 for the override threshold Fth similarly to step S25. That is, the override threshold Fth is held without change. If the steering time is set for the override threshold, the normal value (the normal time) is set.

In step S37, the lane keep controller 52 continues the lane keep control on the basis of respective pieces of information acquired by the surrounding information acquisition section 14 and the vehicle information acquisition section 18 similarly to step S26. At this time, the vehicle 10 keeps the travel lane by automatic control. However, if the steering torque being the override threshold Fth (=F1) or larger is detected, the lane can be changed by manual operation.

Figure 4:
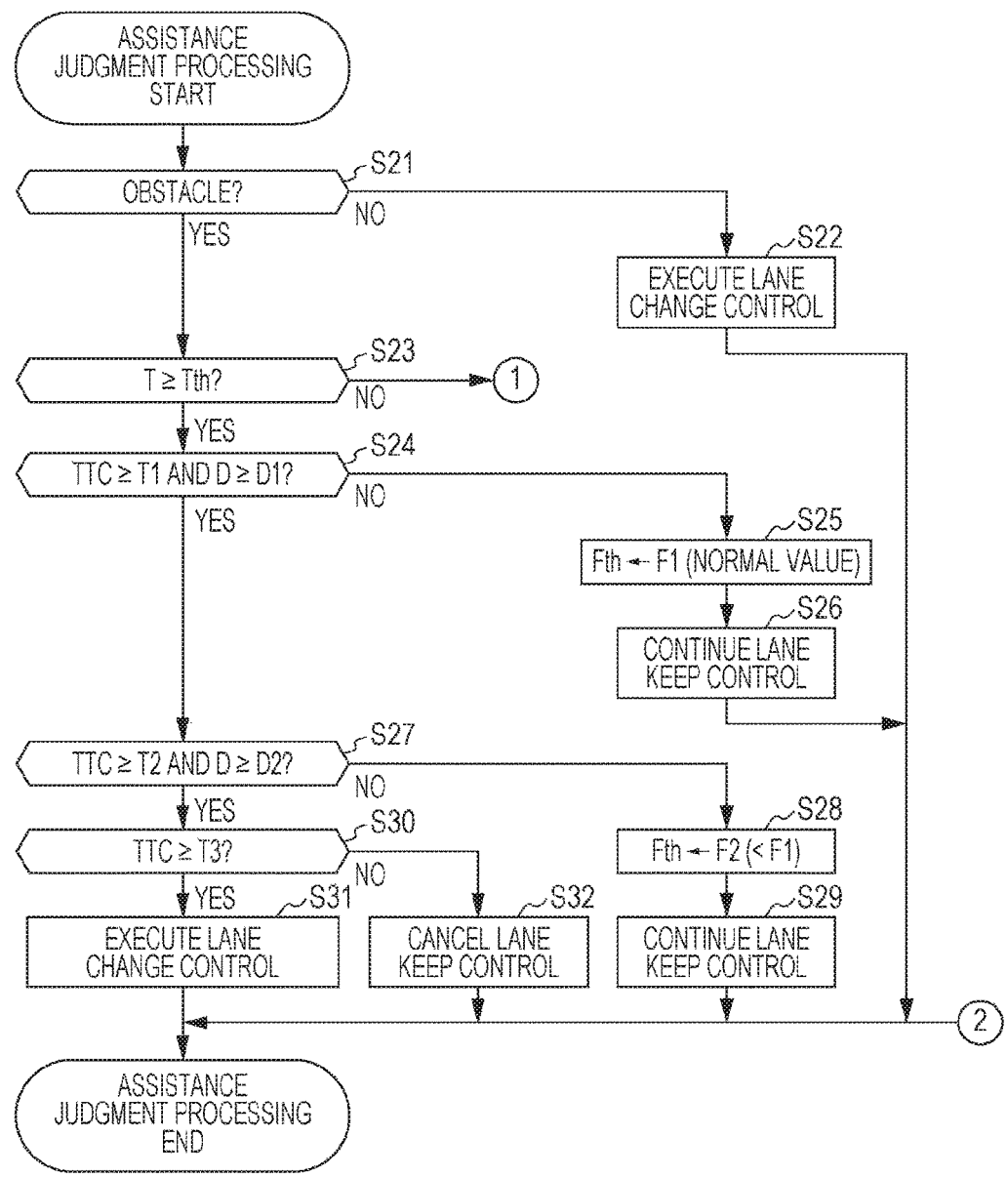
FIG. 4 is a flowchart of assistance judgment processing.
Figure 5:
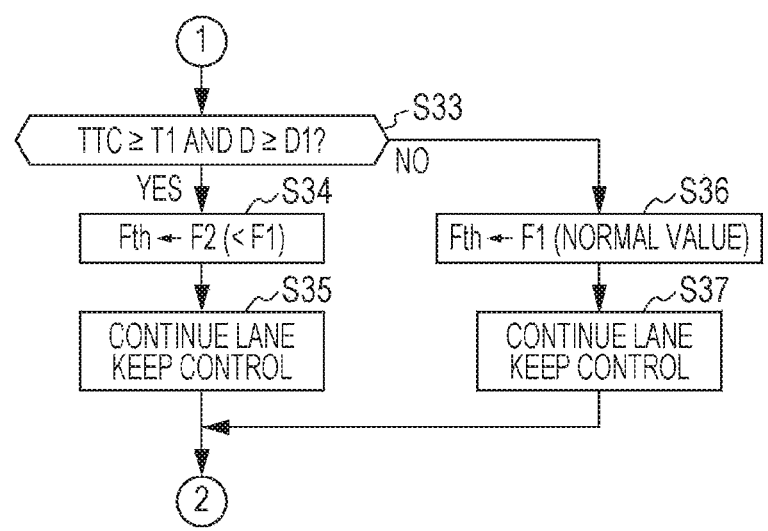
FIG. 5 is a flowchart of assistance judgment processing.

The relationship between respective judgment conditions and respective processing in the assistance judgment processing described with reference to FIGS. 4 and 5 are shown in Tables 1 and 2. Table 1 shows the relationship between respective judgment conditions and respective processing executed if the time measured with the timer T is the previously set predetermined time Tth or longer (step S23: YES). Table 2 shows the relationship between respective judgment conditions and respective processing executed if the time measured with the timer T is shorter than the previously set predetermined time Tth (step S23: NO).

TABLE 1

| Conditions | Travel assistance contents |
|---|---|
| Condition I: TTC < T1 | Continue lane keep control (override threshold Fth = F1 (normal value)) |
| Condition II: D < D1 | Same as above |
| Condition III: T1 ≤ TTC < T2 (and D1 ≤ D) | Continue lane keep control (override threshold Fth = F2 (<F1)) |
| Condition IV: D1 ≤ D < D2 (and T1 ≤ TTC) | Same as above |
| Condition V: T2 ≤ TTC < T3 (and D2 ≤ D) | Cancel lane keep control |
| Condition VI: T3 ≤ TTC (and D2 ≤ D) | Execute lane change control |

TABLE 2

| Conditions | Travel assistance contents |
|---|---|
| Condition I: TTC < T1 | Continue lane keep control (override threshold Fth = F1 (normal value)) |
| Condition II: D < D1 | Same as above |
| Condition III: T1 ≤ TTC (and D1 ≤ D) | Continue lane keep control (override threshold Fth = F2 (<F1)) |

The meaning of the respective conditions (the time to collision TTC, the distance D) is as follows. Condition I defines a time to collision TTC (shorter than T1) insufficient for lane change. Condition II defines a distance D (smaller than D1) insufficient for lane change. Condition III defines a minimum time to collision TTC (T1 or longer and shorter than T2) required for lane change. Condition IV defines a minimum distance D (D1 or larger and smaller than D2) required for lane change. Condition V defines a time to collision TTC (T2 or longer and shorter than T3) sufficient for lane change. Condition VI defines a time to collision TTC (T3 or longer) available for lane change by automatic control. The conditions V and VI each substantially define a distance D (D2 or larger) sufficient for lane change.

Figure 12:
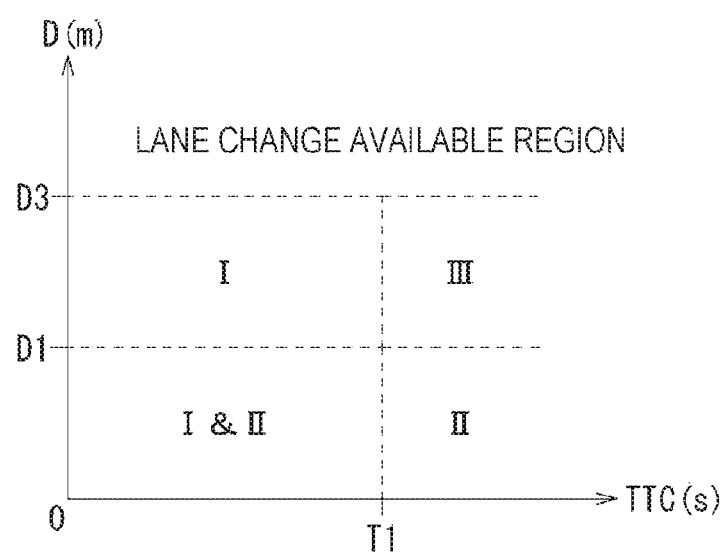
FIG. 12 is a map for conditions including the time-to-collision TTC and the distance D.

FIG. 11 shows regions respectively occupied by the conditions in Table 1 (Conditions I to VI) in a map in which the horizontal axis plots the time to collision TTC and the vertical axis plots the distance D. FIG. 12 shows regions respectively occupied by the conditions in Table 2 (Conditions I to III) in a map in which the horizontal axis plots the time to collision TTC and the vertical axis plots the distance D similarly to FIG. 11. In viewpoint of fail safe, in the maps shown in FIGS. 11 and 12, the priority order of judgment is Condition I=Condition II>Condition III=Condition IV>Condition V=Condition VI. For example, with any value of distance D, if the time to collision TTC is shorter than T1, classification is made to Condition I. Also, with any value of time to collision TTC, if the distance D is smaller than D1, classification is made to Condition II. The region with the distance D3 or larger corresponds to a rear position of the predetermined area A indicated in FIG. 6A and other drawings, and hence the region is a lane change available region.

When the assistance judgment processing is executed, assistance processing corresponding to the respective conditions may be judged by using maps as shown in FIGS. 11 and 12.

2.3 Other Processing

In step S28 in FIG. 4 and step S34 in FIG. 5, the value F2 smaller than the normal value F1 may be set for the override threshold Fth, and then after a certain time elapses, the override threshold Fth may be changed to the normal value F1. In this case, when the lane keep controller 52 sets F2 for the override threshold Fth, the timing unit 56 starts measuring the time. Then, after the certain time elapses, the lane keep controller 52 sets the normal value F1 for the override threshold Fth.

3. Summary of Embodiment

The travel control device 12 includes the surrounding information acquisition section 14 and the recognition unit 40 (the surrounding detection unit), the operation detection unit 46 (the intention detection unit), the lane keep controller 52, and the lane change controller 54. The surrounding information acquisition section 14 and the recognition unit 40 detect the surrounding situation of the vehicle 10. The operation detection unit 46 detects the winker operation (the lane change intention) of the driver. The lane keep controller 52 executes the lane keep control on the basis of the detection result of the lane mark LM by the camera 24 and the lane mark recognizer 42 (the surrounding detection unit). The lane change controller 54 determines whether the lane change is available or unavailable on the basis of the detection result of the obstacle 90 by the radars 26 and the obstacle recognizer 44 (the surrounding detection unit) in response to the detection of the winker operation by the operation detection unit 46. Then, the lane change control is executed if it is determined that the lane change is available. Further, the lane keep controller 52 continues the lane keep control (step S26 and step S29 in FIG. 4, step S35 and step S37 in FIG. 5), if the operation detection unit 46 detects the winker operation during the lane keep control and if the lane change controller 54 determines that the lane change is unavailable (step S21: YES in FIG. 4).

With the travel control device 12, even if the lane change control is not executed, the lane keep control is not canceled and is continued. Hence, if the driver executes the winker operation to intend to execute the lane change control while continuing the lane keep control, a vehicle operation not intended by the driver, in which the lane change control is invalidated and the lane keep control is canceled, can be improved. Accordingly, travel assistance meeting the intention of the driver can be continued. Also, the driver can provide the lane change intention by the simple winker operation.

Also, the lane keep controller 52 continues the lane keep control (steps S26 and S29 in FIG. 4, and steps S35 and S37 in FIG. 5) if the lane change controller 54 changes the determination to the determination that the lane change is unavailable (step S17: YES in FIG. 3) in a period from the determination that the lane change is available by the lane change controller 54 (step S11: NO in FIG. 3) to the detection of the winker operation by the operation detection unit 46 (step S15: YES in FIG. 3).

The driver provides the lane change intention by the winker operation after the determination that the lane change is available in the vehicle 10. However, the situation may change to the situation in which the lane change is unavailable in the period from the determination that the lane change is available in the vehicle 10 to the provision of the lane change intention by the driver. It is expected that the lane change intention of the driver detected in such a situation is not the intention of canceling the assistance such as the lane keep control, but is the intention of shifting the control from the lane keep control to the lane change control while continuing the assistance. With the travel control device 12, since the lane change control is not executed, the cancellation of the lane keep control, not intended by the driver, can be prevented from occurring.

The lane keep controller 52 cancels the lane keep control in response to the cancel operation performed by the driver. Then, if the lane keep controller 52 continues the lane keep control, the lane keep controller 52 allows the cancel operation of the lane keep control to be more easily performed as compared with the cancel operation in the normal situation. To be specific, if the lane keep controller 52 continues the lane keep control (step S29 in FIG. 4, step S35 in FIG. 5), the override threshold Fth (the predetermined operation amount or the predetermined operation time) is set to be smaller than the normal value F1 (step S28 in FIG. 4, step S34 in FIG. 5). With this embodiment, the lane keep control is continued; however, the lane keep control is more easily canceled in response to the lane change intention of the driver. Accordingly, travel assistance meeting the intention of the driver can be provided.

The lane keep controller 52 sets the cancel operation to be the same as the cancel operation in the normal situation if a certain time elapses since the cancel operation was set to be more easily performed as compared with the cancel operation in the normal situation. With this embodiment, the lane keep control in the normal situation is executed while it is expected that the driver no longer has the lane change intention if the certain time elapses, and hence stable travel assistance can be continued.

The lane keep controller 52 changes the predetermined operation amount or the predetermined operation time in accordance with the distance D or the time to collision TTC of the vehicle 10 with respect to the obstacle (the other vehicle) 90 (step S28 in FIG. 4, step S34 in FIG. 5). With the present application, the predetermined operation amount or the predetermined operation time for canceling the lane keep control is changed in accordance with the positional relationship with respect to the obstacle (the other vehicle) 90 in the surrounding of the vehicle, and hence travel assistance further meeting the intention of the driver can be provided.

The lane keep controller 52 cancels the lane keep control (step S32 in FIG. 4), if the operation detection unit 46 detects the winker operation after the predetermined time Tth or longer elapses (step S15: YES in FIG. 3 to step S23: YES in FIG. 4) since the change to the determination that the lane change is unavailable by the lane change controller 54 (step S17: YES in FIG. 3).

If the driver fails the winker operation, the driver is required to perform the winker operation again. At this time, the winker operation by the driver is not detected immediately after the determination that the lane change is available in the vehicle 10, and the winker operation is detected after a certain time elapses. It may be expected that the determination is changed to the determination that the lane change is unavailable in the vehicle 10 in this period. With the travel control device 12, if the predetermined time Tth does not elapse since the change to the determination that the lane change is unavailable, it is expected that the driver provides the lane change intention again by the mistake, and the lane keep control can be continued. Also, if the predetermined time Tth or longer elapses since the change to the determination that the lane change is unavailable, it is expected that the driver intends to cancel the lane keep control, and the lane keep control can be canceled.

4. Modifications

Various modifications can be made for the above-described embodiment. For example, in the above-described embodiment, the two values (F1 (the normal value) and F2 (<F1)) are set for the override threshold Fth (the steering torque); however, three or more values may be set. In this case, judgment conditions respectively corresponding to the three values are set. Of course, a similar modification may be applied to the case in which the steering time is set for the override threshold.

Also, in the lane change availability determination/winker detection processing shown in FIG. 3, the notification processing (step S11, step S12) is executed before the winker detection; however, the notification processing may be omitted.

Also, in the above-described embodiment, the lane change intention of the driver is detected in response to the operation of the winker switch 36; however, a switch other than the winker switch 36 may be provided. In this case, the driver operates that switch if the driver intends to change the lane. The operation detection unit 46 determines the presence of the lane change intention of the driver in accordance with the presence of an output signal of that switch. Also, it may be determined that the driver has the lane change intention if the torque sensor 34 detects a temporary operation on the steering wheel 32.

Also, the predetermined area A may be variable in accordance with the situation. For example, the predetermined area A may be widened as the travel speed of the vehicle 10 increases, and the predetermined area A may be narrowed as the travel speed decreases. Accordingly, travel assistance further meeting the intention of the driver can be provided.

Also, the conditions I to VI may be variable. Further, the first time T1 to the third time T3 and the first distance D1 and the second distance D2 being the thresholds for the conditions I to VI may be variable in accordance with the situation. For example, either or all of the first time T1 to the third time T3 and the first distance D1 and the second distance D2 may be increased as the travel speed of the vehicle 10 increases, and either or all of the first time T1 to the third time T3 and the first distance D1 and the second distance D2 may be decreased as the travel speed of the vehicle 10 decreases. Accordingly, travel assistance further meeting the intention of the driver can be provided.

Although a specific form of embodiment has been described above and illustrated in the accompanying drawings in order to be more clearly understood, the above description is made by way of example and not as limiting the scope of the invention defined by the accompanying claims. The scope of the invention is to be determined by the accompanying claims. Various modifications apparent to one of ordinary skill in the art could be made without departing from the scope of the invention. The accompanying claims cover such modifications.

We claim:

1. A travel control device comprising:
   a surrounding detection unit that detects a surrounding situation of a vehicle;
   an intention detection unit that detects a lane change intention of a driver of the vehicle;
   a lane keep controller that executes lane keep control by using a detection result of a lane mark by the surrounding detection unit; and
   a lane change controller that, in response to the detection of the lane change intention detected by the intention detection unit, determines whether lane change is available or unavailable by using a detection result of an obstacle detected by the surrounding detection unit, and executes lane change control if the lane change controller determines that the lane change is available, wherein the lane keep controller continues the lane keep control when the intention detection unit detects the lane change intention during the lane keep control and when the lane change controller determines that the lane change is unavailable, and wherein the lane keep controller continues the lane keep control when, after the lane change controller determines that the lane change is available and before the detection of the lane change intention by the intention detection unit, the lane change controller changes the determination to the determination that the lane change is unavailable.

2. The travel control device according to claim 1, wherein the lane change intention is a winker operation performed by the driver.

3. The travel control device according to claim 1, wherein the lane keep control is canceled in response to a cancel operation performed by the driver, and wherein, when the lane keep controller continues the lane keep control, the lane keep controller changes requirement for the cancel operation to be more easily satisfied as compared with a cancel operation in a normal situation.

4. The travel control device according to claim 3, wherein the lane keep control is canceled if the cancel operation is executed by a predetermined operation amount or larger, or if the cancel operation is executed continuously for a predetermined operation time or longer, and wherein, when the lane keep controller continues the lane keep control, the lane keep controller sets the predetermined operation amount to a smaller value than a normal value in the normal situation or sets the predetermined operation time to a smaller time than a normal time in the normal situation.

5. The travel control device according to claim 4, wherein the lane keep controller changes the predetermined operation amount or the predetermined operation time in accordance with a distance between the vehicle and the obstacle, or in accordance with a time to collision of the vehicle with respect to the obstacle.

6. The travel control device according to claim 3, wherein the lane keep controller restores the requirement for the cancel operation to be the same as the cancel operation in the normal situation when a certain time elapses since the requirement for the cancel operation was set to be more easily satisfied as compared with the cancel operation in the normal situation.

7. The travel control device according to claim 1, wherein the lane keep controller cancels the lane keep control if the intention detection unit detects the lane change intention after a predetermined time or longer elapses since the lane change controller changed the determination to the determination that the lane change is unavailable.

8. A travel control device comprising:
a surrounding detector that detects a surrounding situation of a vehicle;
an intention detector that detects a lane change intention of a driver of the vehicle;
a lane keep controller that executes lane keep control by using a detection result of a lane mark by the surrounding detector; and
a lane change controller that, in response to the detection of the lane change intention detected by the intention detector, determines whether lane change is available or unavailable by using a detection result of an obstacle detected by the surrounding detector, and executes lane change control if the lane change controller determines that the lane change is available, wherein the lane keep controller continues the lane keep control when the intention detector detects the lane change intention during the lane keep control and when the lane change controller determines that the lane change is unavailable, and wherein the lane keep controller continues the lane keep control when, after the lane change controller determines that the lane change is available and before the detection of the lane change intention by the intention detector, the lane change controller changes the determination to the determination that the lane change is unavailable.

9. A vehicle travel control method comprising steps of:
detecting, by a computer, a surrounding situation of a vehicle;
detecting, by the computer, a lane change intention of a driver of the vehicle;
executing, by the computer, lane keep control by using a detection result of a lane mark in the detected surrounding situation; and
in response to the detection of the lane change intention, determining, by the computer, whether lane change is available or unavailable by using a detection result of an obstacle in the detected surrounding situation, and executing, the lane change control if the lane change is available, wherein, during the lane keep control, when the lane change intention is detected and the lane change is determined to be unavailable, continuing the lane keep control, and wherein, during the lane keep control, when, after it is determined that the lane change is available and before the detection of the lane change intention, the determination is changed to the determination that the lane change is unavailable, continuing the lane keep control.

10. A travel control device comprising:
a surrounding detection unit that detects a surrounding situation of a vehicle;
an intention detection unit that detects a lane change intention of a driver of the vehicle;
a lane keep controller that executes lane keep control by using a detection result of a lane mark by the surrounding detection unit; and
a lane change controller that, in response to the detection of the lane change intention detected by the intention detection unit, determines whether lane change is available or unavailable by using a detection result of an obstacle detected by the surrounding detection unit, and executes lane change control if the lane change controller determines that the lane change is available, wherein the lane keep controller continues the lane keep control when the intention detection unit detects the lane change intention during the lane keep control and when the lane change controller determines that the lane change is unavailable, wherein the lane keep control is canceled in response to a cancel operation performed by the driver when the cancel operation performed by the driver satisfies a requirement in a normal situation, and wherein, when the lane keep controller continues the lane keep control when the intention detection unit detects the lane change intention during the lane keep control and when the lane change controller determines that the lane change is unavailable, the lane keep controller changes the requirement to a lower requirement which is more easily satisfied than the requirement in the normal situation.

11. The travel control device according to claim 10,
wherein the lane keep control is canceled if the cancel operation is executed by a predetermined operation amount or larger, or if the cancel operation is executed continuously for a predetermined operation time or longer, and wherein, when the lane keep controller continues the lane keep control, the lane keep controller sets the predetermined operation amount to a smaller value than a normal value in the normal situation or sets the predetermined operation time to a smaller time than a normal time in the normal situation.

12. The travel control device according to claim 10,
wherein the lane keep controller changes the predetermined operation amount or the predetermined operation time in accordance with a distance between the vehicle and the obstacle, or in accordance with a time to collision of the vehicle with respect to the obstacle.

13. The travel control device according to claim 10,
wherein the lane keep controller restores the requirement for the cancel operation to be the same as the cancel operation in the normal situation when a certain time elapses since the requirement for the cancel operation was set to be more easily satisfied as compared with the cancel operation in the normal situation.

* * * * *